(12) United States Patent
Foley et al.

(10) Patent No.: US 10,800,325 B1
(45) Date of Patent: Oct. 13, 2020

(54) SYSTEMS AND METHODS FOR ILLUMINATING FEATURES WITHIN AN INTERNAL CABIN OF A VEHICLE

(71) Applicant: THE BOEING COMPANY, Chicago, IL (US)

(72) Inventors: Samuel A. Foley, Everett, WA (US); Jonathan Blanchard, Seattle, WA (US); William H. Maclay, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/789,603

(22) Filed: Feb. 13, 2020

(51) Int. Cl.
| | |
|---|---|
| *F21V 11/08* | (2006.01) |
| *B60Q 3/44* | (2017.01) |
| *B60Q 3/51* | (2017.01) |
| *B64D 11/00* | (2006.01) |

(52) U.S. Cl.
CPC ............... *B60Q 3/44* (2017.02); *B60Q 3/51* (2017.02); *F21V 11/08* (2013.01); *B64D 2011/0038* (2013.01)

(58) Field of Classification Search
CPC .. B60Q 3/44; B60Q 3/51; F21V 11/08; B64D 2011/0038
See application file for complete search history.

(56) References Cited

U.S. PATENT DOCUMENTS 10,245,991 B1 * 4/2019 Salter .................... B60N 3/046

* cited by examiner

*Primary Examiner* — Donald L Raleigh
(74) *Attorney, Agent, or Firm* — The Small Patent Law Group LLC; Joseph M. Butscher (57) ABSTRACT

An illumination system and method include a first wall. A light source is mounted on the first wall. The light source is configured to emit light. A second wall is spaced from the first wall. An aperture is formed through the second wall. The aperture is configured to restrict the light. A third wall is spaced from the second wall. The third wall includes a feature. The light source is configured to emit the light through the aperture onto the feature of the third wall to illuminate the feature.

20 Claims, 7 Drawing Sheets

SYSTEMS AND METHODS FOR ILLUMINATING FEATURES WITHIN AN INTERNAL CABIN OF A VEHICLE

FIELD OF EMBODIMENTS OF THE DISCLOSURE

Embodiments of the present disclosure generally relate to illumination systems and methods, and more particularly, to systems and methods for illuminating features within an internal cabin of a vehicle.

BACKGROUND OF THE DISCLOSURE

Commercial aircraft typically include an internal cabin that may be divided into numerous sections. A cockpit is generally separated from a passenger cabin, which may include a first-class section, a business class section, an economy section, and the like.

Within an internal cabin of an aircraft, various features may be displayed. For example, airline operator logos, text, and other features related to branding may be displayed. Walls within an internal cabin may include such features. Spotlights may be used to emit light onto and illuminate such features. However, the light emitted by a spotlight may cause an undesirable halo effect on and/or around the illuminated feature.

Attendant work lights have been used to illuminate areas within an internal cabin. However, a typical attendant work light provides illumination that is too strong for illuminating certain features, and thereby causes the undesirable halo effect in relation to the features. Further, the attendant work light typically cannot aim past twenty degrees from normal (such as a horizontal axis). As such, the attendant work light may not be capable of being positioned high enough so that emitted light does not interfere with eyesight of individuals within an internal cabin. That is, the attendant work light may be positioned at a height at which light shines directly into eyes of an individual within the internal cabin. In short, the twenty degree aim of a typical attendant work light is often not great enough to illuminate a desired feature while also being above eye level of individuals within the internal cabin.

As another option, specialized spotlights may be used to illuminate features within an internal cabin. However, the specialized spotlights are often complex and costly.

SUMMARY OF THE DISCLOSURE

A need exists for an improved system and method of illuminating a feature within an internal cabin of a vehicle. Further, a need exists for a light assembly that illuminates a desired feature while also being above eye level of individuals within an internal cabin of a vehicle. Also, a need exists for a system and method that reduces a halo effect in relation to an illuminated feature. Moreover, a need exists for a system and method of effectively and efficiently illuminating a feature within an internal cabin at low cost.

With those needs in mind, certain embodiments of the present disclosure provide an illumination system including a first wall. A light source is mounted on the first wall. The light source is configured to emit light. A second wall is spaced from the first wall. An aperture is formed through the second wall. The aperture is configured to restrict the light. A third wall is spaced from the second wall. The third wall includes a feature. The light source is configured to emit the light through the aperture onto the feature of the third wall to illuminate the feature.

In at least one embodiment, the first wall and the second wall downwardly extend from a ceiling. The light source may be an attendant work light within an internal cabin of a vehicle.

In at least one embodiment, the light source is located at a first height, and the aperture is located at a second height. The first height is greater than the second height.

In at least one embodiment, the light source is angled to emit light towards and through the aperture. An angle between a normal axis extending from a center of the light source and a longitudinal central axis of the light emitted from the light source is an acute angle. For example, the angle is between zero and sixty degrees. In at least one embodiment, the angle is fifty degrees.

The illumination system may also include a bracket that couples the light source to the first wall. The bracket may include an angled lower panel that supports the light source. The light source may be moveably coupled to the angled lower panel.

The light source is spaced a distance from the aperture. The aperture has a diameter. In at least one embodiment, a ratio between the distance and the diameter is 8:1.

In at least one embodiment, the illumination system also includes a pinhole assembly having at least one lens secured within the aperture. The pinhole assembly may include one or both of a bezel or a sleeve. The lens(es) may be secured within one or both of the bezel or the sleeve.

In at least one embodiment, the pinhole assembly includes a bezel having one or more protuberances that inwardly extend into a central channel. The protuberance(s) are configured to provide a lighting effect to the light.

In at least one embodiment, the feature on the third wall is one or more of a graphic, shape, or text.

Certain embodiments of the present disclosure provide an illumination method including mounting a light source within a space between a first wall and a second wall spaced apart from the first wall, forming an aperture through the second wall (wherein the aperture is configured to restrict the light), angling the light source relative to the aperture to direct light through the aperture at an angle and towards a feature on a third wall having a feature that is spaced apart from the second wall, and emitting (from the light source) light that passes through the aperture onto the feature of the third wall to illuminate the feature.

Certain embodiments of the present disclosure provide A vehicle including an internal cabin, and an illumination system within the internal cabin, as described herein.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide an illumination system and method for illuminating a feature (such as an object, graphic, logo, text, and/or the like) within an internal cabin of a vehicle. The system and method include a light source positioned between a first wall and a second wall, and mounted on the first wall. An aperture (for example, a pin hole) is formed through a second wall that is spaced from the first wall. The aperture restricts light that is emitted from the light source. Light emitted by the light source passes through the aperture and shines on a third wall that is spaced from the second wall. The light shines on the feature, which is on the third wall.

In at least one embodiment, a bezel is mounted in the aperture. A lens may be secured to the bezel. The bezel can have a defined shaped that controls the shape of the light that is cast on the feature. The lens may have different properties that allow for dimming of the light as the light passes through the aperture. Embodiments of the present disclosure provide illumination systems and methods that allow for a size of a lighting effect to be adjusted.

Figure 1:
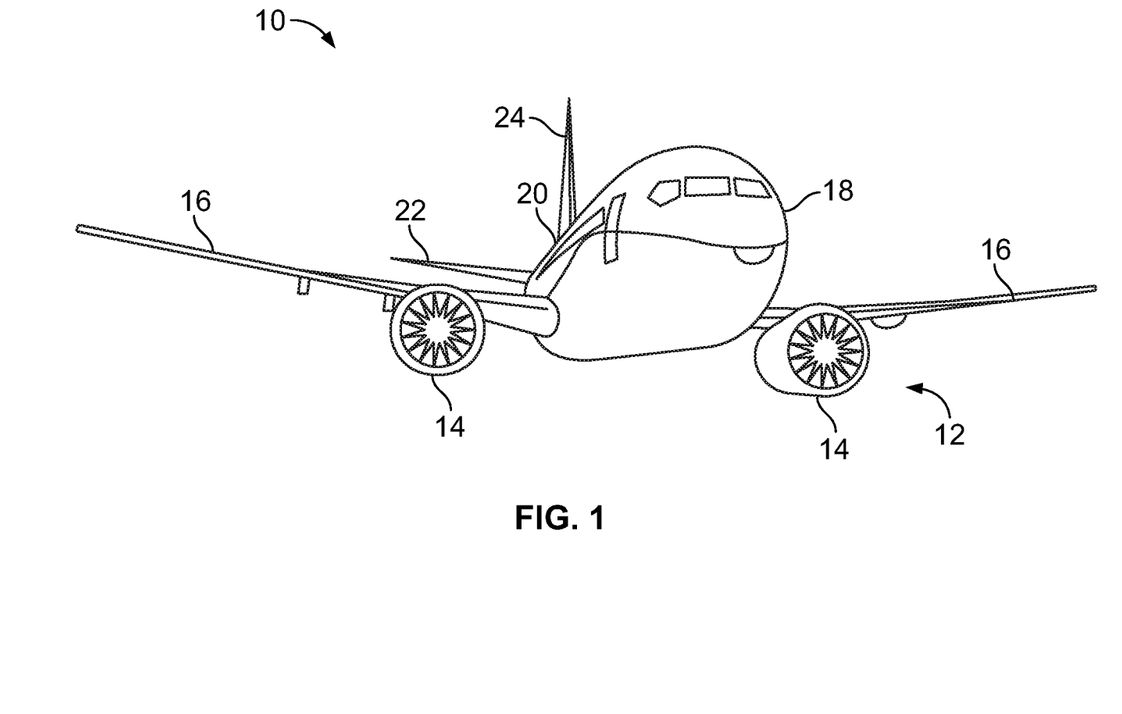
FIG. 1 illustrates a perspective front view of an aircraft, according to an embodiment of the present disclosure.

FIG. 1 illustrates a perspective top view of an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and coach sections), and an aft section. Each of the sections may be separated by a cabin transition area, which may include one or more class divider assemblies. Overhead stowage bin assemblies may be positioned throughout the internal cabin.

Alternatively, instead of an aircraft, illumination systems and methods according to embodiments of the present disclosure may be used with various other vehicles, such as automobiles, buses, locomotives and train cars, seacraft, spacecraft, and the like. As another example, illumination systems and methods according to an embodiments of the present disclosure may be used with fixed structures, such as rooms within the buildings.

Figure 2A:
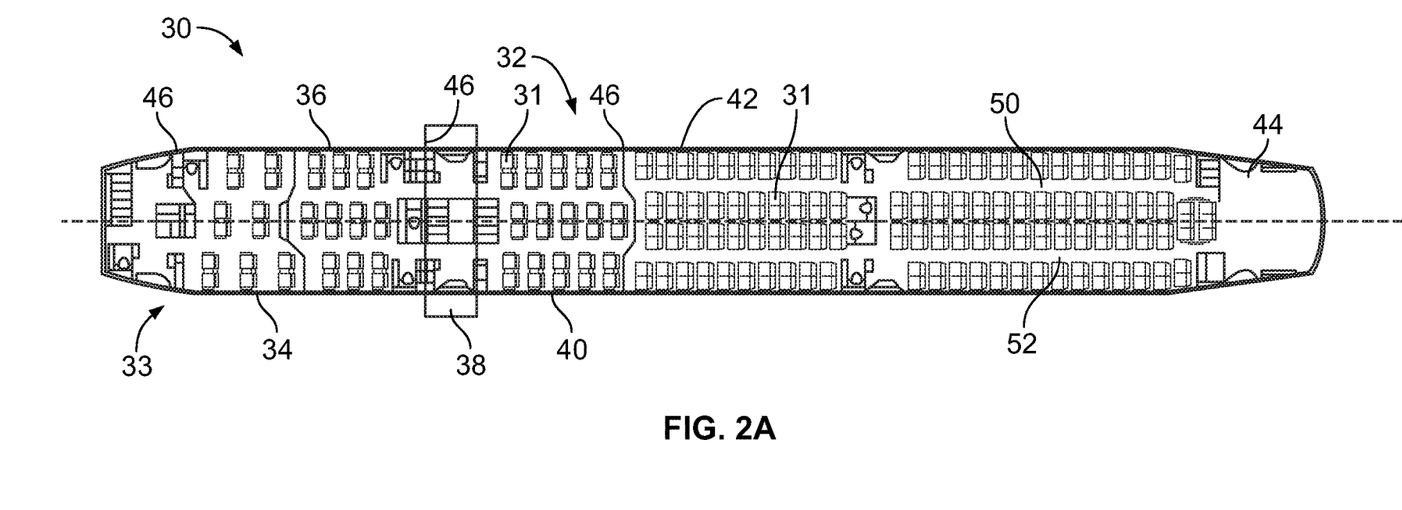
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The internal cabin 30 includes passenger seat assemblies 31 within multiple sections, including a front section 33, a first-class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first-class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Figure 2B:
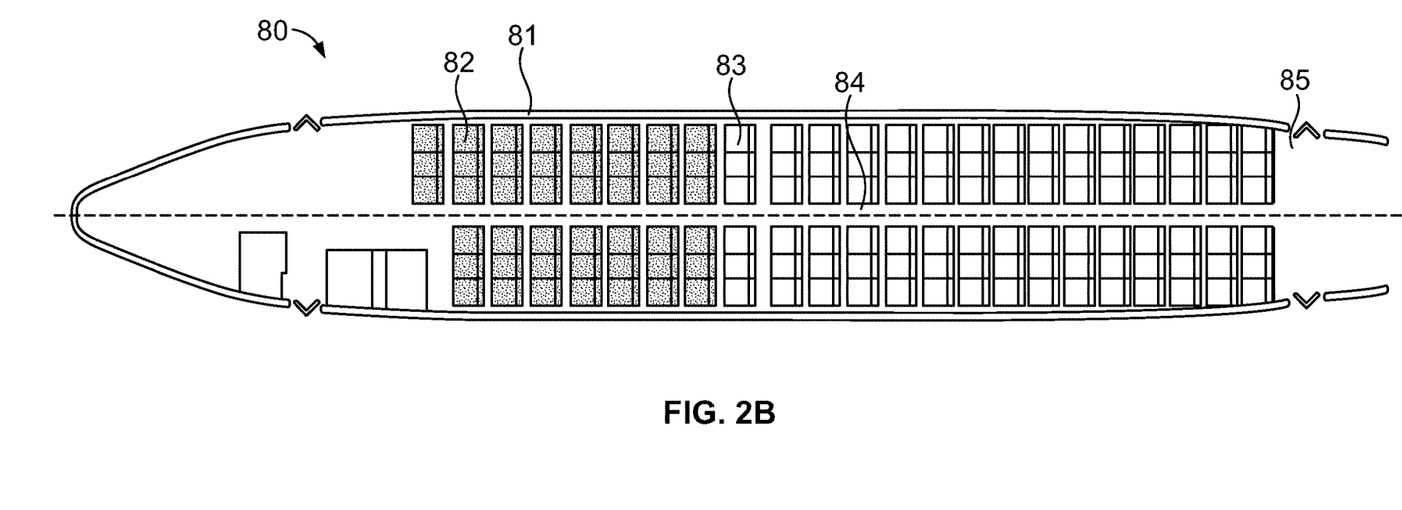
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
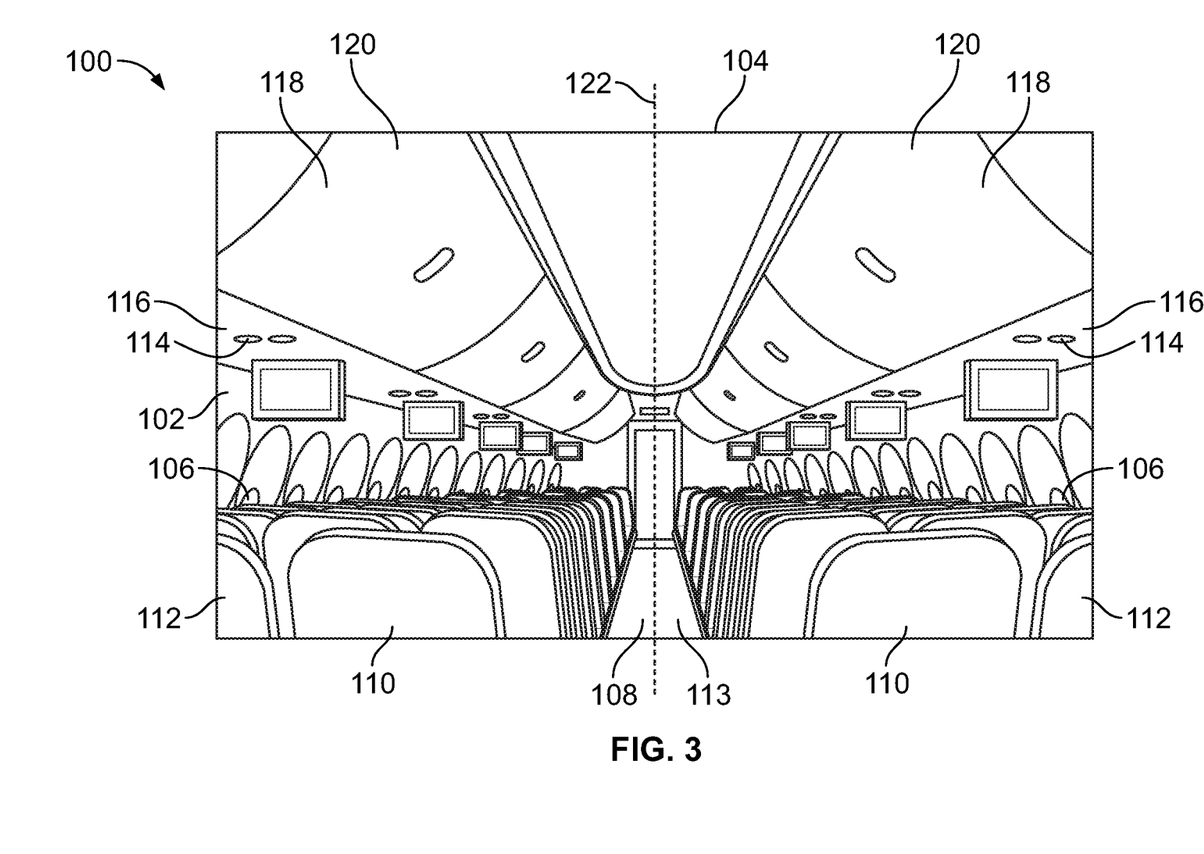
FIG. 3 illustrates a perspective interior view of an internal cabin of an aircraft, according to an embodiment of the present disclosure.

FIG. 3 illustrates a perspective interior view of an internal cabin 100 of an aircraft, according to an embodiment of the present disclosure. The internal cabin 100 includes outboard sidewalls 102 connected to a ceiling 104. Windows 106 may be formed within the outboard sidewalls 102. A floor 108 supports rows of seat assemblies 110. As shown in FIG. 3, a row 112 may include two seat assemblies 110 on either side of an aisle 113. However, the row 112 may include more or less seat assemblies 110 than shown. Additionally, the internal cabin 100 may include more aisles than shown.

Passenger service units (PSUs) 114 are secured between an outboard sidewall 102 and the ceiling 104 on either side of the aisle 113. The PSUs 114 extend between a front (fore) end and rear (aft) end of the internal cabin 100. For example, a PSU 114 may be positioned over each seat assembly 110 within a row 112. Each PSU 114 may include a housing 116 that generally contains vents, reading lights, an oxygen bag drop panel, an attendant request button, and other such controls over each seat assembly 110 (or groups of seats) within a row 112.

Overhead stowage bin assemblies 118 are secured to the ceiling 104 and/or the outboard sidewall 102 above and inboard from the PSU 114 on either side of the aisle 113. The overhead stowage bin assemblies 118 are secured over the seat assemblies 110. The overhead stowage bin assemblies 118 extend between the front and rear end of the internal cabin 100. Each stowage bin assembly 118 may include a pivot bin or bucket 120 pivotally secured to a strongback (hidden from view in FIG. 3). The overhead stowage bin assemblies 118 may be positioned above and inboard from lower surfaces of the PSUs 114. The overhead stowage bin assemblies 118 are configured to be pivoted open in order to receive passenger carry-on baggage and personal items, for example.

As used herein, the term "outboard" means a position that is further away from a central longitudinal plane 122 of the internal cabin 100 as compared to another component. The term "inboard" means a position that is closer to the central longitudinal plane 122 of the internal cabin 100 as compared to another component. For example, a lower surface of a PSU 114 may be outboard in relation to a stowage bin assembly 118.

Illumination systems, as described herein, are disposed within the internal cabin 100. The illumination systems are configured to illuminate features within the internal cabin 100. The features may be disposed on sidewalls 102, the floor 108, divider walls, stowage bins 118, monuments (such as lavatories, closets, or the like), and/or the like.

Figure 4:
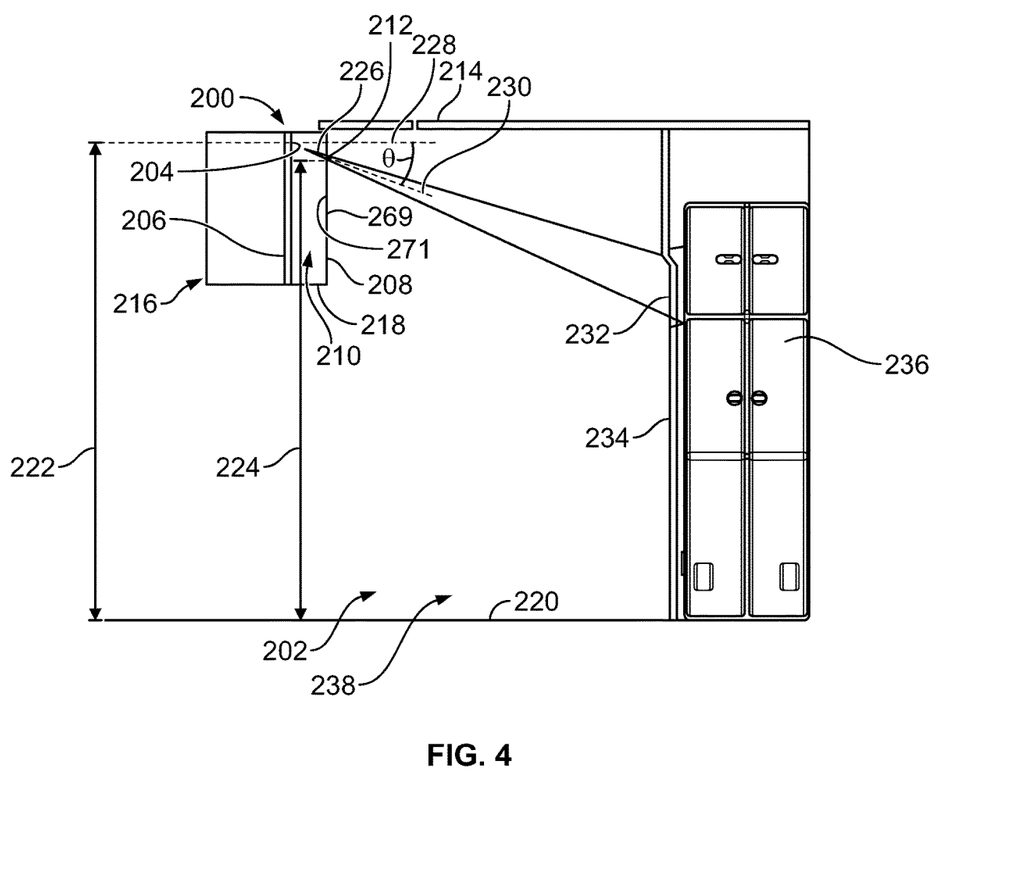
FIG. 4 illustrates a lateral view of an illumination system within an internal cabin of a vehicle, according to an embodiment of the present disclosure.

FIG. 4 illustrates a lateral view of an illumination system 200 within an internal cabin 202 of a vehicle, according to an embodiment of the present disclosure. The internal cabin 100 shown in FIG. 3 is an example of the internal cabin 202.

The illumination system 200 includes a light source 204 mounted to a first wall 206. A second wall 208 is spaced apart from the first wall 206. A space 210 is defined between the first wall 206 and the second wall 208. An aperture 212 is formed through the second wall 208.

As shown, the first wall 206 may be inboard from the second wall 208. Conversely, the second wall 208 is outboard from the first wall 206.

The first wall 206 and the second wall 208 may be coupled to or otherwise downwardly extend from a ceiling 214. In at least one embodiment, the first wall 206 and the second wall 208 may be part of an overhead stowage bin assembly 216. As another example, the first wall 206 and the second wall 208 may be disposed between overhead stowage bin assemblies 216. As another example, the first wall 206 and the second wall 208 may separate walls within the internal cabin that are not connected to an overhead stowage bin assembly 216. For example, the first wall 206 and the second wall 208 may form or otherwise be part of a monument, such as a lavatory, a closet, a divider, or the like within the internal cabin 202.

In at least one embodiment, the light source 204 is an attendant work light. Attendant work lights are certified and approved for use within a vehicle, such as a commercial aircraft. By using an attendant work light, there is no need for additional certification and regulation processes (as the attendant work light is already approved for use within an internal cabin of a commercial aircraft), and, as such, the costs associated with such processes are avoided. Alternatively, the light source 204 may be various other light sources, such as a specialized spotlight.

The first wall 206 and the second wall 208 may connect to a lower wall 218 that is suspended above a floor 220 of the internal cabin 202. In at least one other embodiment, the first wall 206 and the second wall 208 may extend and connect to the floor 220.

The light source 204 is mounted to the first wall 206 and is hidden from view within the internal cabin 202 by the second wall 208. The light source 204 can be mounted to the first wall 206 proximate to the ceiling 214. As shown, in at least one embodiment, the light source 204 is located at a first height 222 from the floor 220. The aperture 212 is located at a second height 224 from the floor 220. The first height 222 is greater than the second height 224. Accordingly, the light source 204 is at a height above that of the aperture 212. Alternatively, the first height 222 may be less than the second height 224, in which cause the light source 204 is angled upwardly, instead of downwardly.

The light source 204 is angled to emit light 226 towards and through the aperture 212. The angle θ between a normal axis 228 extending from a center of the light source 204 and a longitudinal central axis 230 of the light 226 emitted from the light source 204 is an acute angle. In at least one embodiment, the angle θ is between zero and sixty degrees. For example, the angle θ may be between fifteen and fifty degrees. In at least one embodiment, the angle θ is fifty degrees. By disposing the light source 204 at a height above the aperture 212 at an angle of fifty degrees or more, the light source 204 can be positioned at a level that is substantially higher (for example, five or more feet higher) than tops of headrests within a vehicle, and therefore well above eye levels of individuals seated within the internal cabin 202.

The light 226 emitted by the light source 204 passes through the aperture 212 at the angle θ. The emitted light 226 passes from the light source 204, through the aperture 212 and onto logo, emblem, or other such feature 232 disposed on a third wall 234 that is spaced apart from the second wall 208. For example, the third wall 234 may be outboard from the second wall 208. As shown, the third wall 234 may be a wall of a monument 236, such as a closet within the internal cabin 202. The third wall 234 may be separated from the second wall 208 by an aisle 238 of the internal cabin 202.

Optionally, the third wall 234 may be a sidewall panel within the internal cabin. As another example, the third wall 234 may be part of a different monument, such as a lavatory, divider wall, or the like. As another example, the first wall 206 and the second wall 208 may be outboard walls, and the third wall 234 may be an inboard wall.

Figure 5:
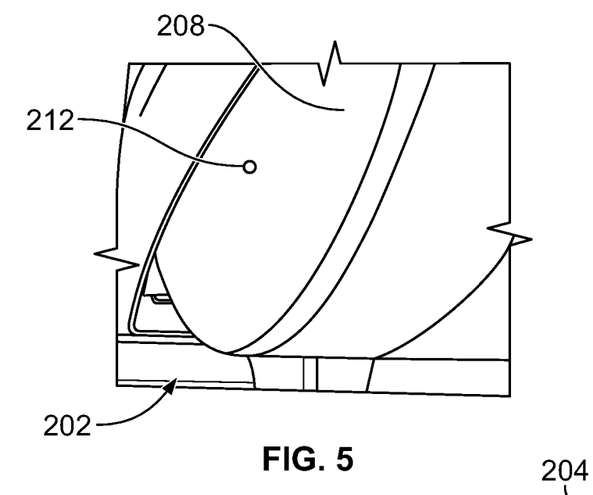
FIG. 5 illustrates a perspective front view of an aperture formed through a wall within the internal cabin, according to an embodiment of the present disclosure.

FIG. 5 illustrates a perspective front view of the aperture 212 formed through the second wall 208 within the internal cabin 202, according to an embodiment of the present disclosure. The second wall 208 may be part of an overhead stowage bin assembly, or otherwise coupled to an overhead stowage bin assembly.

Figure 6:
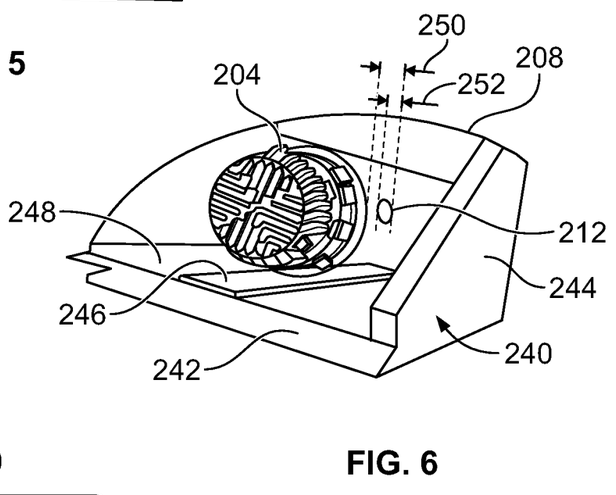
FIG. 6 illustrates a perspective rear view of a light source in relation to the aperture, according to an embodiment of the present disclosure.

FIG. 6 illustrates a perspective rear view of the light source 204 in relation to the aperture 212, according to an embodiment of the present disclosure. In at least one embodiment, the light source 204 is mounted to a bracket 240, which couples the light source 204 to the first wall 206

(shown in FIG. 1). The bracket 240 may include an angled lower panel 242 that connects to one or more lateral panels 244. The light source 204 is supported on the angled lower panel 242, such as at the angle θ. The lower panel 242 and the lateral panel(s) 244 may or may not connect to the second wall 208. Optionally, the light source 204 may be directly mounted to the first wall 206 without the use of a separate bracket. As another example, the light source 204 may be mounted to the first wall 206 through more or less panels, beams, connectors, fasteners, adhesives, other brackets, and/or the like. The light source 204 may be angled downwardly at the angle θ to direct light towards and through the aperture 212.

The light source 204 may be moveably coupled to a track 246 formed on an upper surface 248 of the angled lower panel 242. The light source 204 may be moved towards and away from the aperture 212 via the track 246. Optionally, the light source 204 may not be moveable in relation to the aperture 212.

The light source 204 is spaced a distance 250 from the aperture 212. The aperture 212 has a diameter 252. In at least one embodiment, the distance 250 and the diameter 252 are directly proportional. For example, the closer the light source 204 is to the aperture 212, the smaller the diameter 252 of the aperture 212. Conversely, with increased distance between the light source 204 and the aperture 212, the diameter of the aperture 212 may be larger. In at least one embodiment, the diameter 252 is less than a diameter of a light emission outlet of the light source 204.

The ratio between the distance 250 and the diameter 252 is controlled to eliminate, minimize, or otherwise reduce a halo effect in relation to the feature 232 (shown in FIG. 4). For example, the ratio of the distance 250 to the diameter 252 can be 4:1. In at least one embodiment, the ratio of the distance 250 to the diameter 252 is at least 5:1. It has been found that a ratio of the distance 250 to the diameter 252 of 8:1 eliminates a halo effect in relation to the feature 232. In at least one embodiment, the distance 250 is 6", and the diameter 252 is 0.75". Alternatively, the ratio between the distance 250 and the diameter 252 can be greater or less than 8:1.

Figure 7:
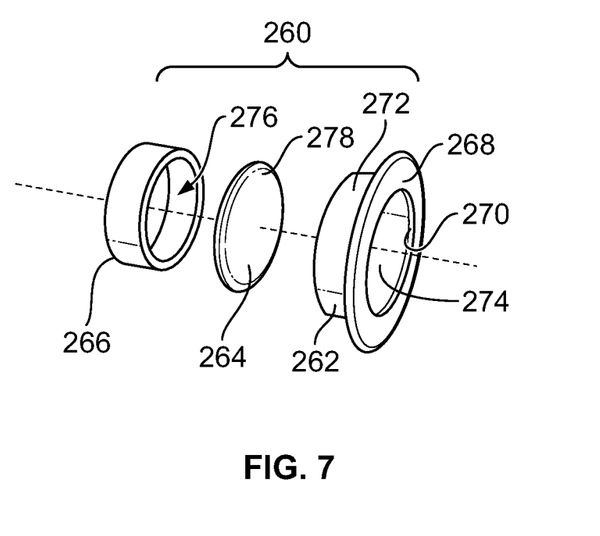
FIG. 7 illustrates a perspective exploded view of a pinhole assembly, according to an embodiment of the present disclosure.

FIG. 7 illustrates a perspective exploded view of a pinhole assembly 260, according to an embodiment of the present disclosure. The pinhole assembly 260 includes a bezel 262, a lens 264, and a sleeve 266. The bezel 262 includes an annular collar 268 radially and outwardly extending from an end 270 of a tube 272 that defines a central channel 274. The sleeve 266 defines a central channel 276.

The sleeve 266 and the bezel 262 are configured to secure the lens 264 therebetween, and/or therein. For example, an outer circumferential edge 278 of the lens 264 may be sandwiched between the sleeve 266 and the tube 272. As another example, the lens 264 may be secured within the tube 272 or the sleeve 266, such as through a groove formed within the tube 272 or the sleeve 266, one or more tabs, clips, or the like, and/or adhesives.

Referring to FIGS. 4, 5, and 7, the pinhole assembly 260 is secured within the aperture 212. In this manner, the light 226 emitted by the light source 204 passes through the lens 264.

In at least one embodiment, the collar 268 of the bezel 262 fits over portions of the second wall 208 that surround the aperture 212. The collar 268 may be flush with an outer surface 269 of the second wall 208. In at least one embodiment, the lens 264 may be proximate to the collar 268. In this manner, the lens 264 protects against foreign objects infiltrating the pinhole assembly 260 and the space 210 between the first wall 206 and the second wall 208.

The lens 264 is proximate to the aperture 212. For example, the lens 264 is disposed within the aperture 212. In at least one other embodiment, the lens 264 is outside of the aperture 212, such as secured on the outer surface 269 (such as via the bezel 262, adhesives, and/or the like). In at least one other embodiment, the lens 264 is secured on an inner surface 271 of the second wall 208.

The lens 264 may be formed of plastic, glass, or the like. In at least one embodiment, the lens 264 is transparent and clear. In at least one other embodiment, the lens 264 may be colored, tinted, or otherwise configured to filter colored light. In at least one embodiment, the lens 264 is a color-filtering lens. In at least one embodiment, the lens 264 is a light-scattering lens. In at least one embodiment, the lens 264 is a light-dimming lens. For example, the lens 264 may be abraded to reduce brightness of light passing out of the lens 264.

Optionally, the pinhole assembly 260 may not include the sleeve 266. Instead, the lens 264 may be secured directly to the bezel 262. As another example, the pinhole assembly 260 may not include the bezel 262. Instead, the lens 264 may be secured directly to the sleeve 266. As another example, the sleeve 266 may be another bezel that is opposite from the bezel 262. As another option, the lens 264 may be directly mounted into the aperture 212 without the use of the bezel 262 or the sleeve 266. In at least one embodiment, the pinhole assembly 260 may include a plurality of lenses 264.

Alternatively, the illumination system 200 may not include the pinhole assembly 260. Instead, the light source 204 may emit the light 226 through the aperture 212, which may be an open passage formed through the second wall 208.

Figure 8:
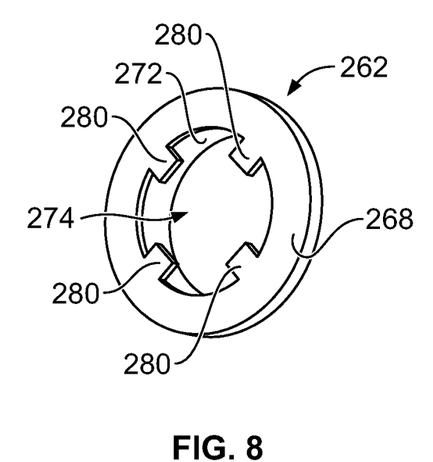
FIG. 8 illustrates a perspective front view of a bezel, according to an embodiment of the present disclosure.

FIG. 8 illustrates a perspective front view of the bezel 262, according to an embodiment of the present disclosure. The bezel 262 may include protuberances 280 that inwardly extend into the central channel 274. The protuberances 280 may inwardly extend from the collar 268 and/or the tube 272. The protuberances 280 block portions of light emitted through the central channel 274, thereby providing a lighting effect (for example, one or more shadows or blocked areas) on the feature 232 (shown in FIG. 4). The protuberances 280 may be sized and shaped differently than shown. Further, the bezel 262 may include more or less protuberances 280 than shown. In at least one embodiment, the bezel 262 does not include any protuberances.

Figure 9:
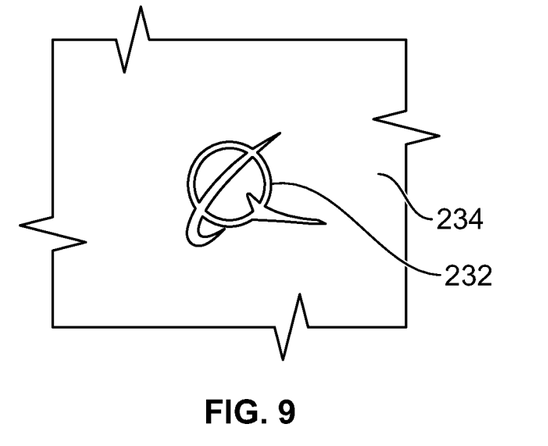
FIG. 9 illustrates a front view of a feature that is illuminated by the illumination system, according to an embodiment of the present disclosure.

FIG. 9 illustrates a front view of the feature 232 that is illuminated by the illumination system 200 (shown in FIG. 4), according to an embodiment of the present disclosure. The feature 232 may be a graphic, such as a company logo, as shown in FIG. 9, displayed on the third wall 234. The feature 232 may be a shape, which may or may not include the graphic and/or text. For example, the shape may include a raised or protruding area, depressed or recessed area, and/or the like.

Figure 10:
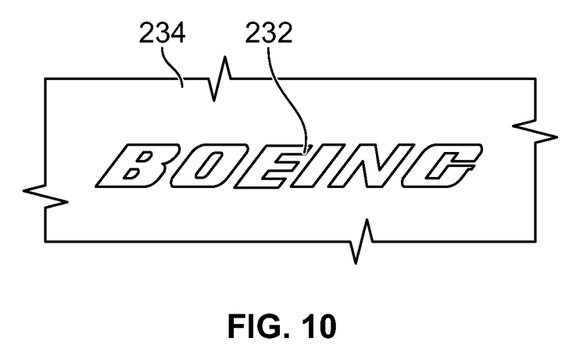
FIG. 10 illustrates a front view of a feature that is illuminated by the illumination system, according to an embodiment of the present disclosure.

FIG. 10 illustrates a front view of the feature 232 that is illuminated by the illumination system 200 (shown in FIG. 4), according to an embodiment of the present disclosure. The feature 232 may be text, such as a company name, as shown in FIG. 10, displayed on the third wall 234.

Referring to FIGS. 4 and 8-10, in at least one embodiment, the bezel 262 may include the protuberances 280, which may be sized and shaped to block portions of light so that the light emitted onto the third wall 234 is shaped as the feature 232. That is, instead of forming the feature 232 directly on the wall, the protuberances 280 of the bezel 262 may block portions of the emitted light 226 so that the emitted light 226 impinging on the third wall 234 forms the feature 232. In short, the feature 232 on the third wall 234 may be a lighting effect instead of (or in addition to) actual formations on the third wall 234.

Figure 11:
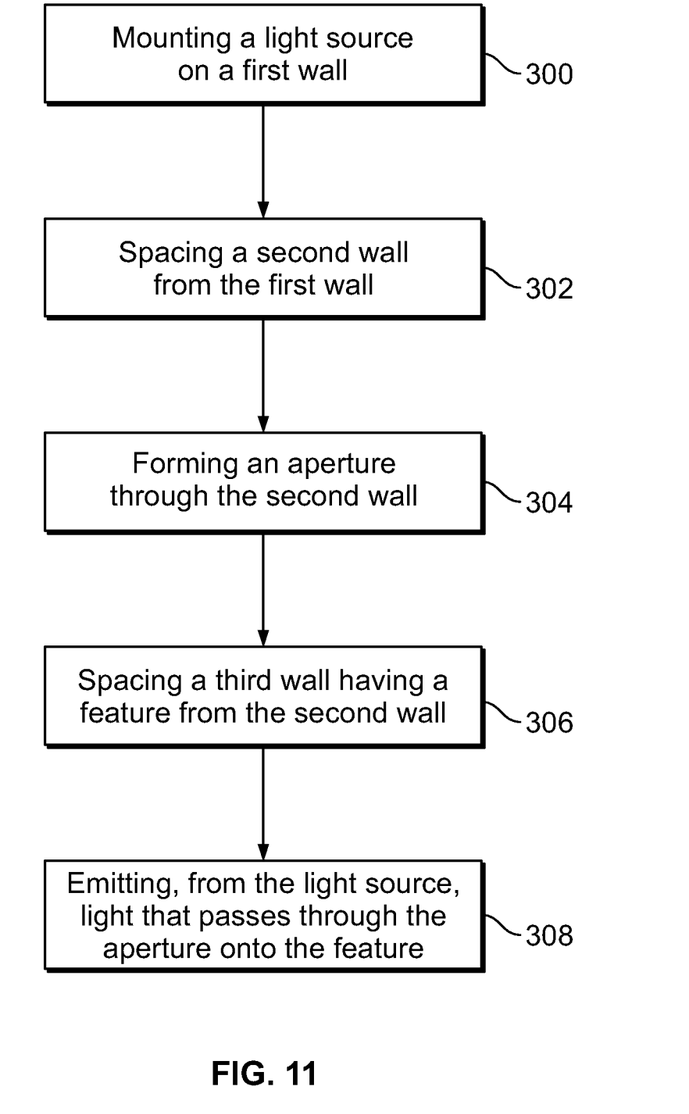
FIG. 11 illustrates a flow chart of an illumination method, according to an embodiment of the present disclosure.

FIG. 11 illustrates a flow chart of an illumination method, according to an embodiment of the present disclosure. The illumination method includes mounting (300) a light source on a first wall; spacing (302) a second wall from the first wall; forming (304) an aperture through the second wall, wherein the aperture is configured to restrict the light; spacing (306) a third wall having a feature from the second wall; and emitting (308), from the light source, light that passes through the aperture onto the feature of the third wall to illuminate the feature.

As described herein, embodiments of the present disclosure provide illumination systems and methods for illuminating features within an internal cabin of a vehicle. Further, embodiments of the present disclosure provide illumination systems and methods that illuminates desired features while also being above eye level of individuals within an internal cabin of a vehicle. Also, the illumination systems and methods eliminate, minimize, or otherwise reduce a halo effect in relation to a feature that is being illuminated. Moreover, embodiments of the present disclosure provide cost-effective illumination systems and methods that effectively and efficiently illuminate features within an internal cabin.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An illumination system comprising:
a first wall;
a second wall spaced from the first wall;
a light source positioned between the first wall and the second wall, and mounted on the first wall, wherein the light source is configured to emit light;
an aperture formed through the second wall, wherein the aperture is configured to restrict the light; and
a third wall spaced from the second wall, wherein the third wall includes a feature, and wherein the light source is configured to emit the light through the aperture onto the feature of the third wall to illuminate the feature, wherein the light source is located at a first height, and the aperture is located at a second height, and wherein the first height is greater than the second height.

2. The illumination system of claim 1, wherein the first wall and the second wall downwardly extend from a ceiling.

3. The illumination system of claim 1, wherein the light source is an attendant work light within an internal cabin of a vehicle.

4. The illumination system of claim 1, wherein the light source is angled to emit light towards and through the aperture.

5. The illumination system of claim 1, wherein an angle between a normal axis extending from a center of the light source and a longitudinal central axis of the light emitted from the light source is an acute angle.

6. The illumination system of claim 5, wherein the angle is between zero and sixty degrees.

7. The illumination system of claim 5, wherein the angle is fifty degrees.

8. The illumination system of claim 1, further comprising a bracket that couples the light source to the first wall.

9. The illumination system of claim 1, wherein the bracket comprises an angled lower panel that supports the light source.

10. The illumination system of claim 9, wherein the light source is moveably coupled to the angled lower panel.

11. The illumination system of claim 1, wherein the light source is spaced a distance from the aperture, and the aperture has a diameter.

12. The illumination system of claim 11, wherein a ratio between the distance and the diameter is 8:1.

13. The illumination system of claim 1, further comprising a pinhole assembly having at least one lens secured within the aperture.

14. The illumination system of claim 13, wherein the pinhole assembly further comprises one or both of a bezel or a sleeve, wherein the at least one lens is secured within one or both of the bezel or the sleeve.

15. The illumination system of claim 13, wherein the pinhole assembly further comprises a bezel having one or more protuberances that inwardly extend into a central channel, wherein the one or more protuberances are configured to provide a lighting effect to the light.

16. The illumination system of claim 1, wherein the feature is one or more of a graphic, shape, or text.

17. An illumination method comprising:
   mounting a light source within a space between a first wall and a second wall spaced from the first wall;
   forming an aperture through the second wall, wherein the aperture is configured to restrict the light;
   angling the light source relative to the aperture to direct light through the aperture at an angle and towards a feature on a third wall having a feature that is spaced apart from the second wall; and
   emitting, from the light source, light that passes through the aperture onto the feature of the third wall to illuminate the feature, wherein the light source is located at a first height, and the aperture is located at a second height, and wherein the first height is greater than the second height.

18. A vehicle comprising:
   an internal cabin; and
   an illumination system within the internal cabin, wherein the illumination system, comprises:
      a first wall downwardly extending from a ceiling;
      a second wall downwardly extending from the ceiling and spaced from the first wall;
      a light source positioned between the first wall and the second wall, and mounted on the first wall, wherein the light source is angled and configured to emit light, wherein the light source is located at a first height;
      an aperture formed through the second wall, wherein the aperture is configured to restrict the light, wherein the aperture is located at a second height, wherein the first height is greater than the second height, wherein the light source is spaced a distance from the aperture, and the aperture has a diameter, wherein a ratio between the distance and the diameter is 8:1;
      a pinhole assembly having at least one lens secured within the aperture; and
      a third wall spaced from the second wall, wherein the third wall includes a feature having one or more of a graphic, shape, or text, and wherein the light source is configured to emit the light through the aperture onto the feature of the third wall to illuminate the feature.

19. The vehicle of claim 18, wherein the light source is an attendant work light within the internal cabin.

20. The vehicle of claim 18, wherein an angle between a normal axis extending from a center of the light source and a longitudinal central axis of the light emitted from the light source is an acute angle.

* * * * *